(12) United States Patent
Fogelberg et al.

(10) Patent No.: US 11,535,108 B2
(45) Date of Patent: Dec. 27, 2022

(54) METHOD AND SYSTEM FOR CONTROLLING AN ELECTRICAL SYSTEM

(71) Applicant: Volvo Car Corporation, Gothenburg (SE)

(72) Inventors: Fabian Fogelberg, Stora Höga (SE); Axel Vänerhav, Lerum (SE)

(73) Assignee: Volvo Car Corporation, Gothenburg (SE)

( * ) Notice: Subject to any disclaimer, the term of this patent is extended or adjusted under 35 U.S.C. 154(b) by 634 days.

(21) Appl. No.: 16/675,286

(22) Filed: Nov. 6, 2019

(65) Prior Publication Data
US 2020/0172086 A1 Jun. 4, 2020

(30) Foreign Application Priority Data
Dec. 3, 2018 (EP) ..................................... 18209778

(51) Int. Cl.
*B60L 3/00* (2019.01)
*B60K 28/10* (2006.01)
(Continued)

(52) U.S. Cl.
CPC ................ *B60L 3/04* (2013.01); *B60K 28/10* (2013.01); *B60L 3/0069* (2013.01); *B60W 20/50* (2013.01); *B60K 2028/006* (2013.01)

(58) Field of Classification Search
CPC ...... B60W 20/50; B60K 28/10; B60L 3/0069; B60L 3/04
See application file for complete search history.

(56) References Cited

U.S. PATENT DOCUMENTS 5,389,824 A 2/1995 Moroto et al.
2002/0195290 A1* 12/2002 Hayakawa ............. B60K 28/14
180/277

(Continued)

FOREIGN PATENT DOCUMENTS

CN 108327539 * 7/2018 ............ B60L 3/0007
CN 108327539 A 7/2018
(Continued)

OTHER PUBLICATIONS

Anonymous:"ISO6469-4:2015Electrically propelled road vehicles—Safety specifications—Part 4:Postcrash electrical safety", Sep. 1, 2015,vol. ISO6469-4, pp. 1-15 (Year: 2015).*
(Continued)

*Primary Examiner* — Vivek D Koppikar
*Assistant Examiner* — Joan T Goodbody
(74) *Attorney, Agent, or Firm* — Clements Bernard Walker; Christopher L. Bernard

(57) ABSTRACT

A method for reactivation of an electrical system of a vehicle comprising a first electrical system operating at a first lower voltage and a second electrical system operating at a second higher voltage, comprising: detecting a fault or a crash situation in the second electrical system; disconnecting a power source of the second electrical system; determining the fault of the second electrical system is no longer present or that the crash situation is resolved; reconnecting the power source to the second electrical system and increasing the voltage of the second electrical system from zero to an intermediate voltage lower than the second voltage; and if a detected current in the second electrical system is higher than a current threshold value; or if a detected voltage of the first electrical system is higher than a voltage threshold value; reducing the voltage of the second electrical system to zero.

19 Claims, 3 Drawing Sheets

(51) Int. Cl.
  *B60L 3/04* (2006.01)
  *B60W 20/50* (2016.01)
  *B60K 28/00* (2006.01)

(56) References Cited

U.S. PATENT DOCUMENTS

| | | | |
|---|---|---|---|
| 2015/0224881 A1* | 8/2015 | Deyda | B60L 3/0015 701/29.2 |
| 2015/0255975 A1* | 9/2015 | Siciak | B60L 58/21 307/9.1 |
| 2016/0156179 A1 | 6/2016 | Walter | |
| 2018/0067167 A1 | 3/2018 | Bohne et al. | |
| 2018/0143235 A1 | 5/2018 | Kim | |

FOREIGN PATENT DOCUMENTS

| | | | | |
|---|---|---|---|---|
| DE | 102015201899 A1 * | 8/2016 | | B60L 3/0092 |
| DE | 2015215284 A1 | 2/2017 | | |
| EP | 3103670 A1 | 12/2016 | | |
| JP | 09284901 A | 10/1997 | | |
| JP | 2015002627 A | 1/2015 | | |
| WO | 2013106626 A2 | 7/2013 | | |
| WO | WO-2014041043 A2 * | 3/2014 | | B60L 1/00 |
| WO | 2018192271 A1 | 10/2018 | | |
| WO | WO-2018192271 A1 * | 10/2018 | | B60L 3/00 |

OTHER PUBLICATIONS

Apr. 16, 2019 European Search Report issued on International Application No. 18209778.
Anonymous: "ISO 6469-4:2015 Electrically propelled road vehicles—Safety specifications—Part 4: Post crash electrical safety", Sep. 1, 2015, vol. ISO 6469-4, pp. 1-15.
United Nations: "Global technical regulation on hydrogen and fuel cell vehicles", Jul. 19, 2013, Addendum 13: Global technical regulation No. 13., pp. 1-115.
National Highway Traffic Safety Administration et al., "49 CFR 571.305 Standard No. 305; Electric-powered vehicles: electrolyte spillage and electrical shock protection." Oct. 1, 2011, pp. 1-9.
National Highway Traffic Safety Administration et al., "Final Rule; Standard No. 305 Electric Powered Vehicles", Federal Register, Sep. 27, 2017, vol. 82, No. 186, pp. 1-21.
United Nations: "R100 Electric power trained vehicles", Aug. 14, 2013, pp. 1-82.

* cited by examiner

METHOD AND SYSTEM FOR CONTROLLING AN ELECTRICAL SYSTEM

CROSS-REFERENCE TO RELATED APPLICATION

The present disclosure claims the benefit of priority of co-pending European Patent Application No. 18209778.2, filed on Dec. 3, 2018, and entitled "METHOD AND SYSTEM FOR CONTROLLING AN ELECTRICAL SYSTEM," the contents of which are incorporated in full by reference herein.

TECHNICAL FIELD

The present invention relates to a method and system for reactivation of an electrical system in a vehicle. In particular, the invention relates to a method and system in a vehicle comprising a first and a second electrical system.

BACKGROUND

In modern vehicles it is increasingly important to reduce emissions from the combustion engine to comply with environmental regulations. Since reduced fuel consumption directly leads to reduced emissions, it is desirable to find previously unexplored paths for further reducing the fuel consumption of vehicles.

One way of reducing fuel consumption is to convert functionality of the vehicle which has previously been powered by the combustion engine to instead be electrically powered, i.e. functionalities which migrate from the mechanical to the electrical domain.

Moreover, there is an increasing number of functions of the vehicle requiring electrical power, putting higher demands on the power supply system. Many vehicles may for example be operated as hybrid vehicles where power for propulsion is in part provided by a vehicle battery and an electrical motor. There are also an increasing number of critical safety systems and/or driver assistance systems which demand a reliable power supply.

To address the above issues, so called "mild hybrid" electrical systems have been introduced in vehicles, typically operating at 48V instead of or in combination with the commonly used 12V system.

However, with an electrical system operating at a higher voltage than prior systems follows higher safety and reliability requirements. Accordingly, there is a need for improved power supply systems for mild hybrid vehicles.

SUMMARY

In view of above-mentioned and other drawbacks of the prior art, it is an object of the present invention to provide an improved method and system for handling electrical faults in an electrical system of a vehicle.

According to a first aspect of the invention, there is provided a method for reactivation of an electrical system of a vehicle comprising a first electrical system operating at a first voltage and a second electrical system operating at a second voltage, where the second voltage is higher than the first voltage. The method comprises: detecting a fault in the second electrical system or detecting a crash situation; disconnecting a power source of the second electrical system; determining that the fault of the second electrical system is no longer present or detecting that the crash situation is resolved; reconnecting the power source to the second electrical system and increasing the voltage of the second electrical system from zero to an intermediate voltage lower than the second voltage; and if a detected current in the second electrical system is higher than a current threshold value; or if a detected voltage of the first electrical system is higher than a voltage threshold value; reducing the voltage of the second electrical system to zero.

In the present context, the first and second electrical systems are defined by their respective operating voltages. However the first and second electrical systems may still be interconnected and integrated in various ways.

The present invention is based on the realization that it may be possible to recover from a detected fault in the second electrical system or a crash situation without having to completely shut down the vehicle and without having to go to a workshop to analyze and repair the vehicle. According to the claimed method, the reconnection of a power source after a detected fault or crash has been resolved is done by increasing the voltage from zero up to an operating voltage. The reason is that even though it has been determined that the fault of the second electrical system is no longer present, there may be additional faults which are not detected and/or faults which have arisen as a consequence of the first fault.

During the increase in voltage, the system is specifically monitored to determine if either the system current or system voltage exceeds set threshold values. The threshold is advantageously set so that any damage to the first electrical system is prevented if a fault remains when the power source is reconnected. Moreover, since the voltage of the second electrical system is increased to an intermediate voltage which is lower than the second operating voltage, the risk of damage to the electrical systems is further reduced.

By means of the described method, the robustness of the electrical system is improved since it is possible to reconnect the electrical system during driving which may lower or remove user impact.

According to one embodiment of the invention, the voltage threshold value may be the same as the first voltage. Thereby, the voltage of the power source is reduced to zero and reconnection is stopped if the voltage of the first electrical system exceeds the predetermined operating voltage. Since the operating voltage of the second electrical system is higher than the operating voltage of the first electrical system, it can be determined that a fault is remaining if the voltage of the first electrical system exceeds a nominal operating voltage. This may for example occur if an uncontrolled or accidental electrical connection has been formed between the first and second electrical system.

According to one embodiment of the invention, the voltage threshold value may be equal to a voltage safety limit of the first electrical system. An electrical system is typically designed to be able to withstand a voltage higher than the operating voltage, at least for a limited time period. The voltage threshold value may thus be set to a predetermined voltage which is higher than the first operating voltage but where the first electrical system is not damaged. Such a safety limit may for example be twice the operating voltage of the first electrical system.

According to one embodiment of the invention, increasing the voltage to an intermediate voltage comprises may advantageously comprise ramping the voltage. Thereby, the voltage is not abruptly applied and a fault can be detected in time before any of the components in the electrical systems is damaged. The specific properties of the ramp may be controlled based of the properties of the electrical systems.

According to one embodiment of the invention, the voltage ramp may be a fixed ramp, meaning that the voltage is increasing at a constant rate from zero and up to the intermediate voltage. If the voltage would be increased in a discrete step and there is an electrical short between the two electrical systems, there is a potential for component damage. This can be mitigated by using a limited ramp and by using the described voltage and current threshold values that are set to be non-damaging to the electrical components.

According to one embodiment of the invention the intermediate voltage may correspond to a safe voltage level of the second electrical system. Thereby, the voltage provided by the power supply to the second electrical system does not exceed a safe voltage of the first electrical system, meaning that even if there is a short circuit between the first and second electrical systems, the first electrical system does not take damage.

According to one embodiment of the invention the method may further comprise, after the step of detecting a fault in the second electrical system, disconnecting an electrical load from the second electrical system. If it can be determined that the fault is caused by a load of the system, the faulty load may be disconnected for the remaining loads of the system to be operated.

According to one embodiment of the invention, the method may further comprise, if a fault is detected, disconnecting loads from the second electrical system, and wherein the step of reconnecting comprises reconnecting the power source and if no fault is detected after increasing the voltage of the second electrical system, connecting an electrical load to the second electrical system. Thereby, the integrity of the electrical system can be verified without connected loads to determine if the fault lies in the electrical system as such or in one of the connected loads. Moreover, if there is a plurality of loads to be connected, they can be connected one by one in order to determine if the fault lies with one of the loads. The method may comprise disconnecting all loads of the second electrical system. However, it may be sufficient to disconnect loads so that the voltage of the second electrical system is reduced to zero, meaning that loads capable of storing or providing power are disconnected whereas purely resistive loads may remain connected.

According to one embodiment of the invention the current threshold may advantageously be set higher than an expected transient current resulting from reconnecting the power source. When the power source is connected to the second electrical system, a small inrush of current is expected also in the first electrical system. The current threshold value is thus preferably set so as to not be exceeded by the expected current transient.

According to one embodiment of the invention the current threshold may be set lower than an expected transient current resulting from reconnecting the power source, and wherein the method comprises filtering the current transient. Filtering may for example be performed as time filtering, where the current is not measured or not taken into account during the short initial time period where the transient occur.

According to one embodiment of the invention, detecting a fault in the second electrical system comprises detecting a short circuit between the first electrical system and the second electrical system, detecting a faulty component of the first or second electrical system and disconnecting the faulty component from the first or second electrical system, and/or detecting a software error of the second electrical system. Thereby, a range of different faults can be detected, both hardware and software related faults.

According to a second aspect of the invention, there is provided a control system for a vehicle comprising a first electrical system operating at a first voltage and a second electrical system operating at a second voltage, the second voltage being higher than the first voltage. The control system comprises: a fault detection unit configured to detect a fault in the second electrical system or to detect a crash situation, and an electrical system control unit. The electrical system control unit is configured to: disconnect a power source of the second electrical system; determine that the fault of the second electrical system is no longer present or that the crash situation is resolved; reconnect the power source to the second electrical system and increasing the voltage of the second electrical system from zero to an intermediate voltage lower than the second voltage; and if a detected current in the second electrical system is higher than a current threshold value; or if a detected voltage of the first electrical system is higher than a voltage threshold value; reduce the voltage of the second electrical system to zero.

There is also provided a vehicle comprising a control system according to the second aspect of the invention.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

In the present detailed description, various embodiments of the system and method according to the present invention are mainly described with reference to a vehicle comprising a conventional 12V electrical system and also a 48V electrical system, also referred to as a mild hybrid vehicle. However, the described method and system may also be applicable for other types of electrical systems comprising systems with two different voltages.

Figure 1:
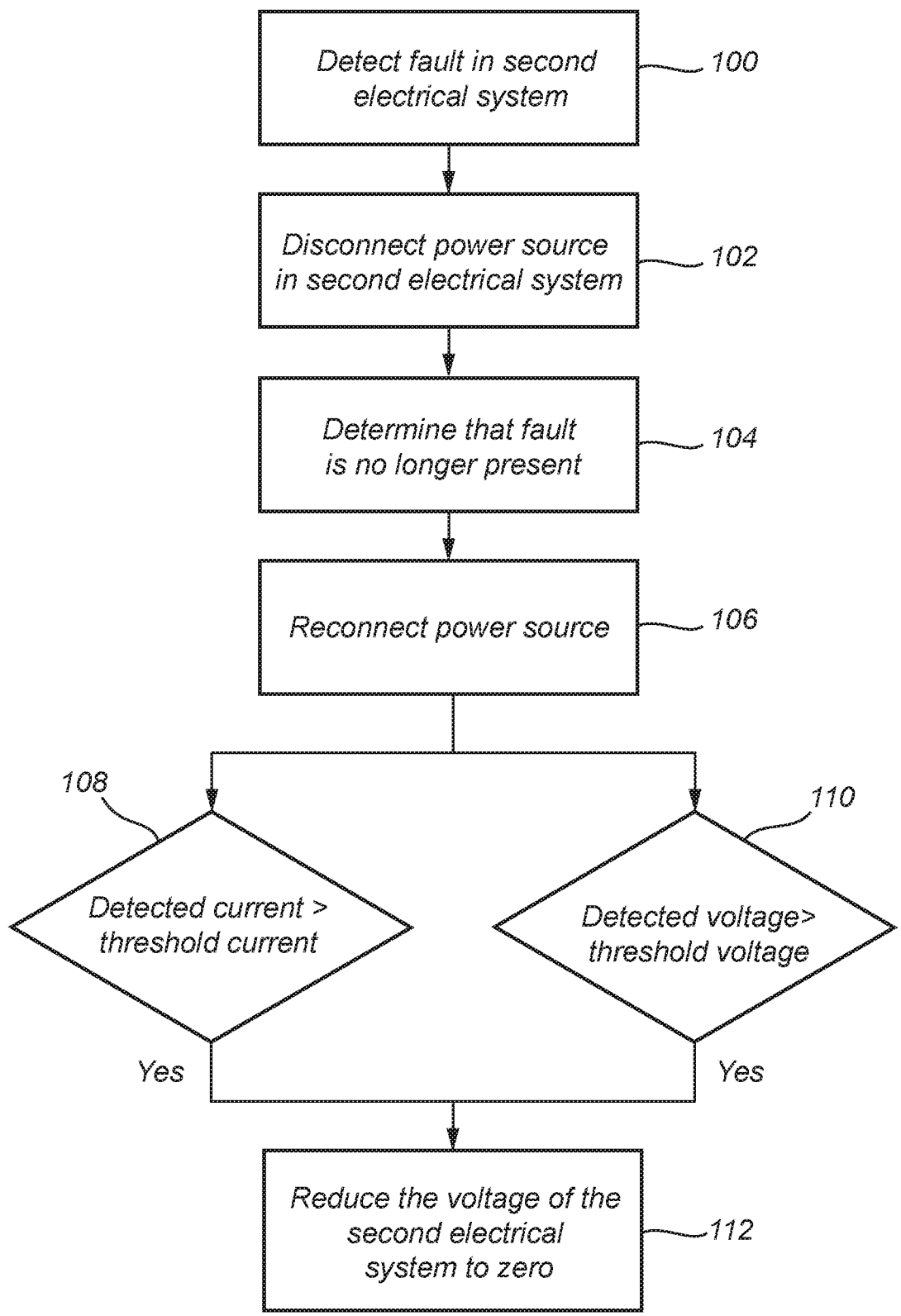
FIG. 1 is a flow chart outlining the general steps of a method according to an embodiment of the invention.
Figure 2:
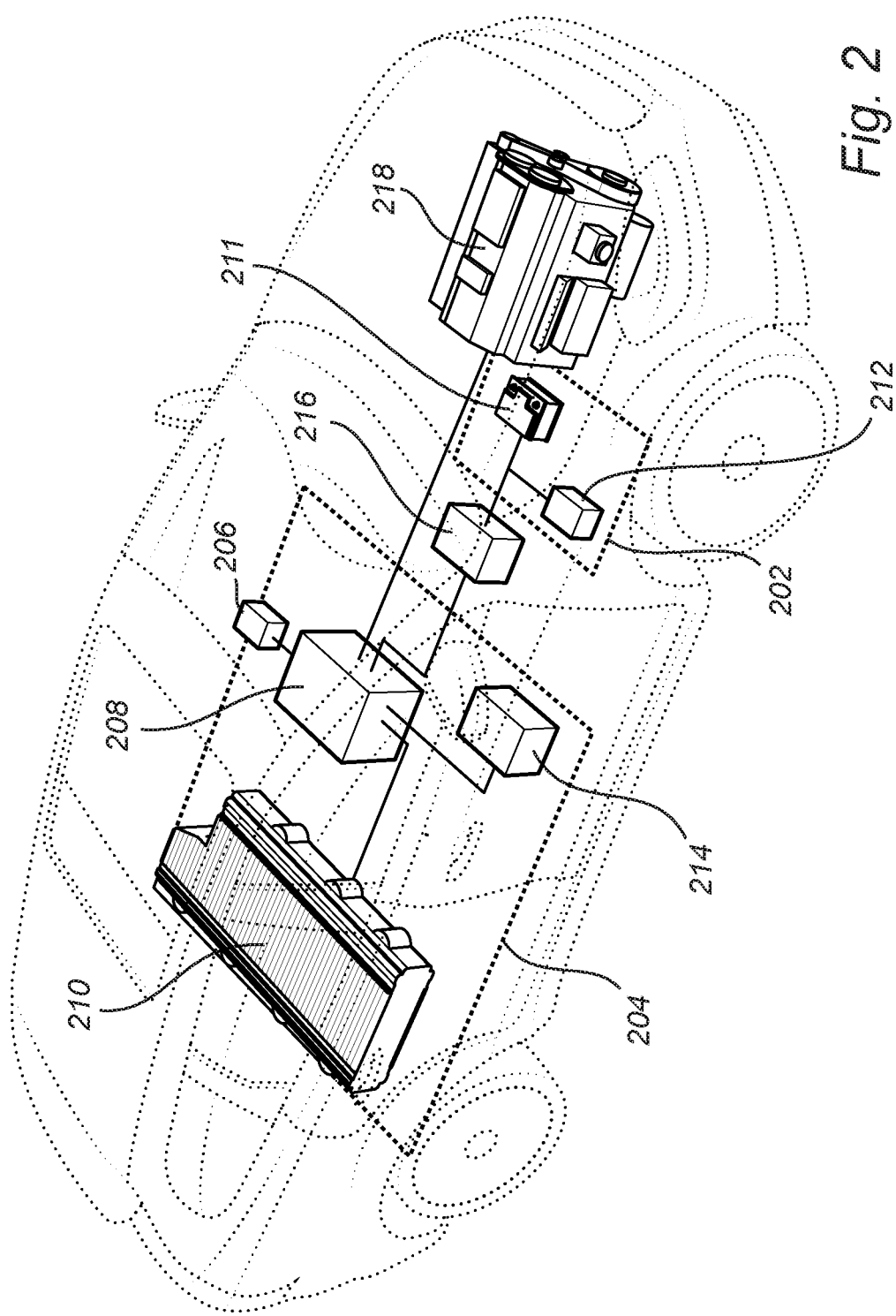
FIG. 2 schematically illustrates a system according to an embodiment of the invention.

FIG. 1 is a flow chart outlining the general steps of a method according to an embodiment of the invention, and the method will be described with further reference to FIG. 2 schematically illustrating a control system 200 according to an embodiment of the invention.

FIG. 2 illustrates a control system 200 for a vehicle comprising a first electrical system 202 operating at a first voltage and a second electrical system 204 operating at a second voltage. In the present description, the first voltage is 12V and the second voltage is 48V, and the second voltage is thus higher than the first voltage. The control system 200 comprises: a fault detection unit 206 configured to detect a fault in the second electrical system 204 and an electrical system control unit 208. The electrical system control unit 208 is configured to perform the steps of a method according to an embodiment of the invention.

The described control units may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control method will be described with reference to a detected fault in the second electrical system 204. However, the method operates in the same way also if the second electrical system has been disconnected as a result of a detected crash situation. A crash situation may be a detected crash event, or it may be a situation which is anticipated to lead to a crash, where it is advantageous to shut off the second electrical system 204 as a precaution to avoid that the higher voltage of the second electrical systems damages components of the vehicle.

In a first step, a fault in the second electrical system 204 is detected 100 followed by disconnecting 102 a power source 210 of the second electrical system 204. The power source 210 of the second electrical system may for example be a 48V battery 210. In the described, example, the first electrical system 202 comprises a 12V battery 211.

In the next step, it is determined 104 that that the fault of the second electrical system 204 is no longer present. This can for example be determined by running diagnostic tests of the electrical system, or by disconnecting a component which is known to be the cause of the detected problem.

Once it is determined that determined 104 that that the fault of the second electrical system 204 is no longer present, at least with the possible degree of certainty, the power source 210 is reconnected 106 the second electrical system 204 and the voltage applied to the second electrical system 204 is increased from zero to an intermediate voltage lower than the second voltage.

The voltage is advantageously increased using a voltage ramp, and during the voltage ramp, the current in the second electrical system 204 and the voltage of the first electrical system 202 is monitored.

Accordingly, if 108 a detected current in the second electrical system 204 is higher than a current threshold value or if 110 a detected voltage of the first electrical system is higher than a voltage threshold value, the voltage the voltage of the second electrical system 204 reduced is 112 to zero. The current in the second electrical system may for example be expected to be zero if the loads of the second electrical system 204 are disconnected or deactivated, meaning that the current threshold value is set to zero. However, it may also be possible to allow a current to flow as long as the current does not exceed set safety limits, meaning that the current threshold value is set to a finite value.

Moreover, a voltage in the first electrical system 202 which is higher than the expected operating voltage is indicative of a short circuit between the first and second electrical systems 202, 204.

FIG. 2 further illustrates loads 212, 214 connected to the first and second electrical system 202, 204, respectively. The illustrated system 200 further comprises a DC/DC 216 converter arranged between the first and second electrical systems 202, 204, and a combustion engine 218 arranged to provide power to the electrical systems 202, 204 and to charge the batteries 210, when required.

Potential faults for example include a short from 48V plus wire to 12 V plus as a result of crash impact or a software fault where disconnection is needed to ensure safety. In case of a software fault, the described reconnection methodology may in such case enable uninterrupted driving.

Figure 3:
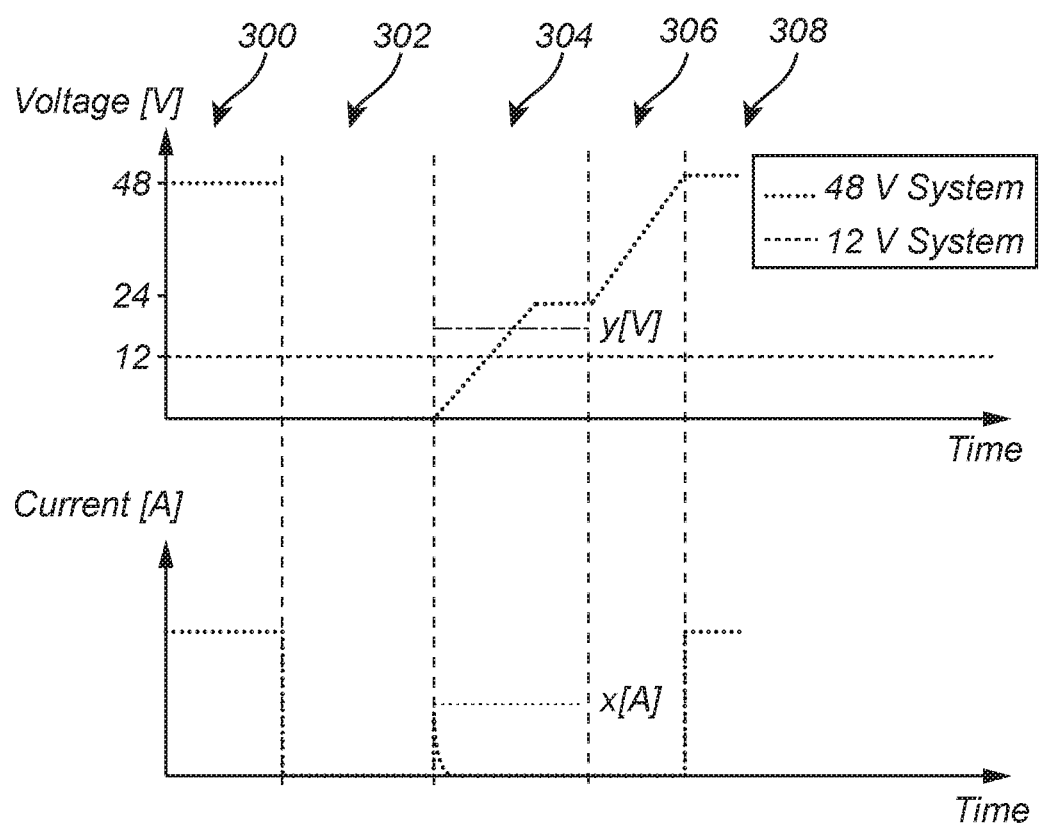
FIG. 3 comprises graphs schematically illustrating features of the method and system according to embodiments of the invention.

FIG. 3 schematically illustrates the voltage of the first and second electrical system 202, 204 and the current in the second electrical system 204 as a function of time for an example embodiment of the described method and system.

In the first time period 200, the voltage in the first electrical system 202 is 12V and the voltage in the second electrical system 204 is 48V. In the second time period 302, a fault of the second electrical system 204 is detected and the voltage of the second electrical system 202 is reduced to zero, consequently the current is also reduced to zero. For the first system, i.e. the 12V system, it can be assumed that the voltage is maintained at a constant level even if a fault in the second electrical system is detected.

In the third time period 304, the power source is reconnected, or activated, and the voltage is increased using a fixed voltage ramp from zero and up to an intermediate voltage. An example ramp time up to the intermediate voltage may be 500 ms, meaning that the voltage ramp rate is 48 V/s. The intermediate voltage is here defined as half of the operating voltage, i.e. 24V. In the graph illustrating the current, it can be seen that a short current transient occurs when the power source is reconnected. The current threshold value (x(A)) may thus be set higher than the current transient to avoid that the initial current is identified as a fault in the system. The duration of the current transient is negligible in comparison with the ramp time up to the intermediate voltage.

If the current of the first electrical system does not exceed the current threshold value and if the voltage of the first electrical system does not exceed the voltage threshold value (y(V)), it is assumed that the two electrical systems are operating as intended, and the voltage is ramped up to the operating voltage of 48V as illustrated in the fourth time period 306.

Once the operating voltage of the second electrical system 204 is reached and no errors are detected, the loads can be reconnected and the electrical systems can be operated according to normal procedures as illustrated in the fifth time period 308.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for reactivation of an electrical system of a vehicle comprising a first electrical system operating at a first voltage and a second electrical system operating at a second voltage, the second voltage being higher than the first voltage, the method comprising:
    detecting a fault in the second electrical system or detecting a crash situation;
    disconnecting a power source of the second electrical system;
    determining that the fault of the second electrical system is no longer present or that the crash situation is resolved;
    reconnecting the power source to the second electrical system and increasing the voltage of the second electrical system from zero to an intermediate voltage lower than the second voltage; and
    if a detected current in the second electrical system is higher than a current threshold value; or
    if a detected voltage of the first electrical system is higher than a voltage threshold value;
    reducing the voltage of the second electrical system to zero.

2. The method according to claim 1, wherein the voltage threshold value is the same as the first voltage.

3. The method according to claim 1, wherein the voltage threshold value is equal to a voltage safety limit of the first electrical system.

4. The method according to claim 1, wherein increasing the voltage to an intermediate voltage comprises ramping the voltage.

5. The method according to claim 4, wherein the ramp is a fixed ramp.

6. The method according to claim 1, further comprising, after the step of detecting a fault in the second electrical, disconnecting an electrical load from the second electrical system.

7. The method according to claim 1, further comprising, if a fault is detected, disconnecting loads from the second electrical system, and wherein the step of reconnecting comprises reconnecting the power source and if no fault is detected after increasing the voltage of the second electrical system, connecting an electrical load to the second electrical system.

8. The method according to claim 1, wherein the current threshold is set higher than an expected transient current resulting from reconnecting the power source.

9. The method according to claim 1, wherein the current threshold is set lower than an expected transient current resulting from reconnecting the power source, and wherein the method comprises filtering the current transient.

10. The method according to claim 1, wherein detecting a fault in the second electrical system comprises detecting a short circuit between the first electrical system and the second electrical system.

11. The method according to claim 1, wherein detecting a fault in the second electrical system comprises detecting a faulty component of any system and disconnecting the faulty component.

12. The method according to claim 1, wherein detecting a fault in the second electrical system comprises detecting a software error of the second electrical system.

13. A control system for a vehicle comprising a first electrical system operating at a first voltage and a second electrical system operating at a second voltage, the second voltage being higher than the first voltage, the control system comprising:
    a fault detection unit comprising a processor or programmable logic device that detects a fault in the second electrical system or to detect a crash situation; and
    an electrical system control unit comprising a processor or programmable logic device that:
    disconnects a power source of the second electrical system;
    determines that the fault of the second electrical system is no longer present or that the crash situation is resolved;
    reconnects the power source to the second electrical system and increasing the voltage of the second electrical system from zero to an intermediate voltage lower than the second voltage; and
    if a detected current in the second electrical system is higher than a current threshold value; or
    if a detected voltage of the first electrical system is higher than a voltage threshold value;
    reduces the voltage of the second electrical system to zero.

14. The control system according to claim 13, wherein the electrical system control unit further reconnects the power source and, if no fault is detected after increasing the voltage of the second electrical system, connects an electrical load to the second electrical system.

15. The control system according to claim 13, wherein the voltage threshold value is the same as the first voltage.

16. The control system according to claim 13, wherein the voltage threshold value is equal to a voltage safety limit of the first electrical system.

17. The control system according to claim 13, wherein increasing the voltage to an intermediate voltage comprises ramping the voltage.

18. The control system according to claim 17, wherein the ramp is a fixed ramp.

19. A vehicle comprising a control system according to claim 13.

* * * * *